Oct. 12, 1965          E. I. VALYI          3,211,133

FLUID HEATING UNIT

Original Filed June 14, 1962

INVENTOR.
EMERY I. VALYI
BY
Robert H. Bachman
ATTORNEY

United States Patent Office 3,211,133
Patented Oct. 12, 1965

3,211,133
FLUID HEATING UNIT
Emery I. Valyi, Riverdale, N.Y., assignor to Olin Mathieson Chemical Corporation, a corporation of Virginia
Original application June 14, 1962, Ser. No. 202,612. Divided and this application Aug. 25, 1964, Ser. No. 397,360
1 Claim. (Cl. 122—33)

This application is a division of co-pending application Serial No. 202,612, filed June 14, 1962, which in turn is a continuation-in-part of application Serial No. 732,663, filed May 2, 1958, now U.S. Patent 3,049,795. Said U.S. Patent 3,049,795 is in turn a continuation-in-part of application Serial No. 586,259, filed May 21, 1956, now abandoned.

This invention relates to porous fabrications, and more particularly to a permeable body integrated to a supporting sheet metal structure adapted to conduct a fluid to the said permeable body for flow and distribution therethrough.

As brought in the aforesaid co-pending applications, the subject matter thereof was directed to novel features wherein a permeable body formed of powdered metal is joined to a supporting metal structure so as to become integral therewith in all areas except where they are formed between the permeable and impervious portions of the structure.

The resultant porous fabrication may be utilized advantageously in various applications. For example, it may be employed in the subsequent manufacture of gas burners that are intended to provide evenly distributed heat over large surfaces. In such applications a combustible gas is distributed by the fluid channels to different portions of the permeable body through which it flows to emanate on the combustion side thereof substantially uniformly over most of the surface of that body at a substantially uniform rate, thus producing a flame blanket. The resultant porous fabrication may also be utilized advantageously in the construction of evaporative coolers whereby an efficient cooling surface is obtained by using the porous metal body as a means through which to distribute over a large area the liquid which is to evaporate for the purposes of transportation cooling. In a further application, the porous fabrication may be utilized in the construction of filters wherein the porous metal body provides a controlled porosity and permeability so as to enable a liquid carrier to filter through the porous metal body while leaving filtrate on the other side thereof. As will be recognized, one of the most important limitations restricting the use of porous fabrications resides in the fact that it is very difficult and costly to provide conduits which conduct fluids efficiently to the appropriate faces or portions of the porous metal bodies, and therefrom to be distributed into and through such porous metal bodies for the purposes of combustion, evaporation, filtration, or other purposes. Another limitation of porous metal bodies restricting their use in components designed to transfer heat from one medium to another derives from the fact that the heat conduction of such porous bodies in less than that of solid metal bodies and that it is difficult and costly to effect efficient heat transfer to the porous bodies and through them. While the techniques and methods of producing pervious or porous bodies from powder metal have been extensively discussed in the literature such as for example in "Powder Metallurgy" by Dr. Paul Schwarzkopf (the MacMillan Company, New York, 1947) and "Powder Metallurgy" edited by John Wulff (the American Society for Metals, Cleveland, 1942), no economical and efficient method has been found thus far to overcome the limitations above referred to prior to the invention described in the aforesaid co-pending applications; the basic concept of the contribution therein comprises the forming of an integral structure of two or more metal layers of differing characteristics, of which at least one layer is porous and pervious to fluids, such as gases or liquids, and the others impervious and solid, these layers being secured together, preferably through a sintering operation, although brazing and other means may also be employed, so as to enable the formation of fluid channels in predetermined portions between the confronting faces of various layers comprising the integrated porous structure.

In accordance with the disclosure of the aforesaid co-pending applications, the porous fabrication is formed from a supporting sheet metal member which may have all or a portion thereof in the form of a flat, relatively thin plate, sheet, or strip. A pattern of weld-inhibiting material is applied to this member in a design corresponding to that desired for the fluid conducting channels which are to be provided in the ultimate structure. Following the application of the weld-inhibiting material, a substantial layer of powdered metal aggregate is deposited upon the plate thus treated. Subsequent thereto this composite structure may be subjected to pressure to compact the powdered metal and to press it firmly against the solid plate. This compacted assembly is then exposed to a suitable sintering temperature under conditions preventing undesired reactions, such as oxidation of the metal. This sintering operation accomplishes the sintering of the powdered metal particles to each other together with the metallurgical bonding, welding, of the sintered metal aggregate to the solid member.

In an alternate method disclosed in the foregoing co-pending application, the powder metal layer may be separately formed by known powder metallurgy techniques. In this method the solid sheet metal member may be first prepared by applying a pattern of weld-inhibiting material to the portions thereof at which the fluid channels are to be formed, and applying to one side of the porous metal layer a suitable thin layer of soldering or brazing metal. The porous metal layer is then superimposed upon the solid plate so as to sandwich the weld-inhibiting material between them, and the composite subjected to a thermal treatment to accomplish the brazing or soldering of the porous metal layer to the sheet metal member in all adjacent areas thereof except in these portions separated by the weld-inhibiting material.

The resultant composite structure may now be adapted for the conducting of fluids by deforming or flexing those portions of the sheet metal member, which are disposed opposite the weld-inhibiting material, away from the porous metal layer. This can be accomplished for example by introducing a fluid under pressure into the ununited portions of the composite structure formed between the porous layer and a sheet metal member, or mechanically, by insertion of suitable mandrels into these areas. This deformation of the sheet metal member away from the porous metal layer will form fluid channels defined on one side by an impervious metal wall portion and on the other side by the porous metal.

As will be understood, various combinations of materials may be utilized in forming the integrated composite structure; and accordingly the solid sheet metal member and the porous layer or body may be of the same metal or alloy, or the porous structure and the solid member, of the integrated structure, may be comprised of different compositions. For example, both the porous metal layer and a solid sheet metal member may be formed of the same stainless steels, coppers, brass, carbon steels, aluminum or various combinations thereof. As will be understood the ultimate use of the resultant integrated structure determines the specific combination of alloys to be employed.

Accordingly, among the objects of this invention is to provide a novel fluid heating unit utilizing a fluid permeable porous metal structure adapted to distribute a fluid and heat in flow therethrough.

Other objects and advantages of this invention will become more apparent from the following drawings and description in which—

Figure 1:
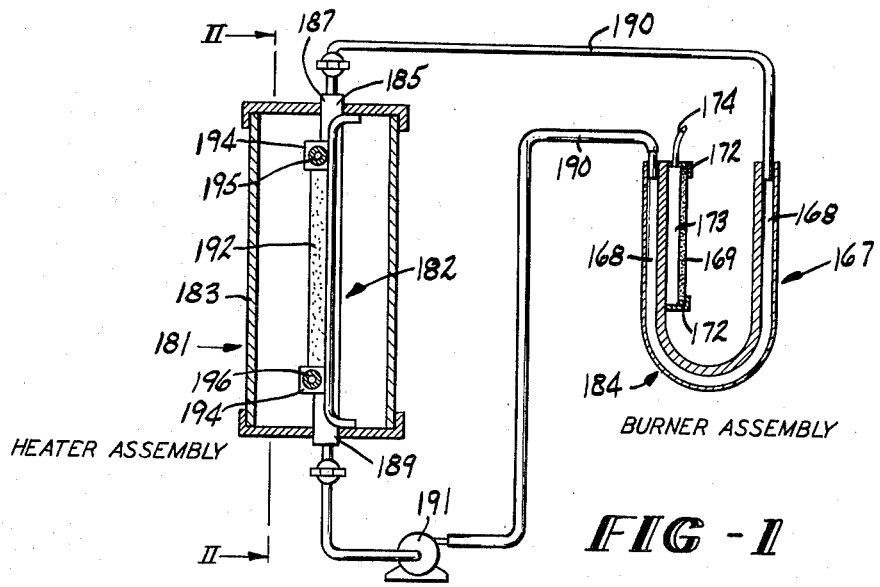
FIGURE 1 is a view partly in section illustrating the fluid heating unit of the present invention.

In regard to production of the porous body, it may be obtained by the so called gravity sintering method which comprises a process wherein graded metal powder, frequently spherical metal powder, is poured by gravity into an appropriately shaped confined space, and usually vibrated to cause it to compact uniformly. As is obvious the choice of particle size of the metal powder will largely determine the amount of porosity, i.e. void space. The metal powder or aggregate so packed is then sintered in accordance with well-known powder metallurgy practices, producing a porous metal body whose bulk density, or apparent density, is but a fraction of the density of the metal or alloy from which the powder particles are obtained. Generally the conditions of vibration and conditions of sintering are chosen to result in an apparent density of approximately 25% to 75% of the solid density of the corresponding alloys. In another procedure for the production of such porous metal bodies the process may comprise blending intimately a graded metal powder with a combustible substance, such as for example wood flour or other organic particulate material, or a soluble material whose melting point exceeds the sintering temperature of the metal powder. After the formulation of this dry blend, the mixture of metal powder and combustible or soluble substance is then compacted under pressure, such as by rolling resulting in a body that has no voids and is reasonably firm, sufficient for handling. This body is then sintered in accordance with well-kown powder metallurgy practices to produce a cohesive structure in which the metal particles are sintered together at their respective points of contact and the combustible or soluble material remains unbonded to the metal particles forming discrete islands within the metal body. Upon completion of the sintering operation and if the non-metallic component is combustible, then the resultant body will in fact contain void spaces everywhere previously occupied by the combustible material since the latter will have burned away in the course of sintering. In the case utilizing a soluble material whose melting point is higher than the sintering temperatures of the metal, the soluble material will remain intact after the final stages of sintering and can be subsequently removed by leaching and dissolving with a liquid, resulting in a network of interconnected pores.

In the modification of the foregoing it is noted the above described dry blend of metal powder and combustible or soluble substance may be replaced, respectively, by a paste or slurry obtained by suspending the admixed powder metal and combustible or soluble particles in a suitable liquid vehicle, as for example water or alcohol; or in application where the combustible substance is mostly organic, by choosing a combustible substance that is a viscous liquid instead of being particulate such as for example a liquid phenolic resin. Alternately the mixture of metal powder and void or pore forming substance and vehicle, or void or pore forming substance alone, may be prepared into a paste which may be brought into the desired shape by pressing or extrusion.

A further method of producing the sintered porous metal bodies comprise melting a metal or alloy and casting it into the interstices of a porous aggregate of a particulate soluble material whose melting point exceeds that of the metal. Upon solidification of the metal, a component is produced which contains the network of the soluble material interspersed within the solid metal which soluble material is thereupon removed by leaching or dissolving, leaving behind it interstices that interconnect and form a porous network within the resultant metal body. Soluble substances contemplated for these purposes, be it for blending with solid metal powder or for the above casting process, comprise sodium chloride in conjunction with aluminum and aluminum alloys, aluminum fluoride in conjunction with copper alloys, and calcium oxide in conjunction with alloys having melting points higher than copper alloys. As will be understood other substances, particularly inorganic salts, are readily available and known to the art for such purpose as for example various phosphates, such as tri-sodium phosphate.

A still further method of producing a porous metal body comprises weaving or knitting metal wire into a mesh arranged in a plurality of layers. According to this process, a control of porosity is obtained by appropriate choice of wire diameters and openings arranged between adjoining wires as well as the juxtapositioning of superimposed layers of the woven or knit mesh.

As will be understood, the selection of materials from which the porous and solid components are made to comprise the structures described herein and in the above-mentioned parent applications, is based on considerations within the skill of persons acquainted with mechanical, physical and chemical properties of materials. While the structures described herein have been identified as being metallic on numerous occasions, it is pointed out that all or parts of these structures may be made of non-metallic materials, as called for by their intended use. Thus, the porous layer may incorporate catalysts, as pointed out in the above-mentioned parent applications, which catalysts may be non-metallic. The porous layer may also consist in part or entirely of glasses, carbides, nitrides, oxides, or borides, for example in instances calling for heat resistances, corrosion resistance or insulating properties not available in metals and alloys. The porous layer may also consist of synthetic polymeric substances, for similar reasons, as for example sintered porous fluorocarbon resins, silicone resins, and others. The solid component is usually made of metal strip or plate which may be coated with non-metallic materials of the kind referred to. In instances not calling for high strength the solid component may also be made of synthetic resins made into strip, sheet or plate stock.

Several of the embodiments described herein may be made advantageously of non-metallic components. Thus, a component intended to distribute highly corrosive inorganic acid vapors may be made of fluorocarbon resins; another intended to serve as diffuser of combustible gas also acting as a radiant burner may be made in part of silicon carbide. Other examples are obvious to those skilled in the art of constructing components to be used in environments of high temperature and corrosive attack.

It will be understood that the porous layer referred to herein may be produced in still additional ways either in situ, upon the surface of a solid component or separately, to be joined thereto. Thus, the porous component may be produced by mechanical perforation of a solid metallic sheet, however, such a method would generally be expensive and cumbersome. The porous layer may also be produced by spraying of metal by techniques well-known to those skilled in the metal working art and carried out either with a wire gun or a powder gun, whereby, through appropriate and well-known adjustment of the spray gun, the spraying process may be directed so as to produce a porous sprayed deposit. A porous sprayed deposit may also be produced with a powder gun by spraying along with the material intended to form the porous layer and intimately intermingled with it an evanescent solid which will be deposited along with the rest of the sprayed material and which may then be removed from the porous composite by leaching as described in previous examples. However, this procedure of producing the porous layer by spraying is also cumbersome and expensive in most instances, compared to the other means described herein and in the co-pending applications.

Figure 2:
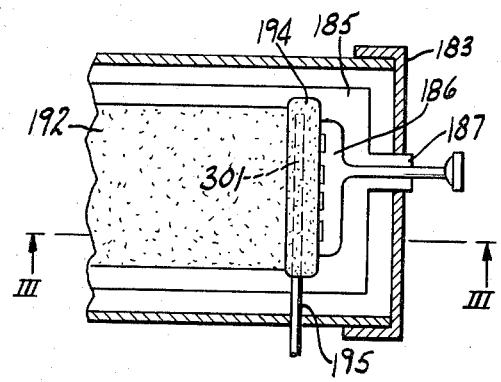
FIGURE 2 is a fragmentary view along the line II—II of FIGURE 1.
Figure 3:
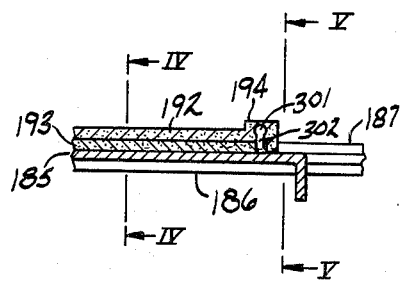
FIGURE 3 is a fragmentary view along the line III—III of FIGURE 2.
Figure 4:
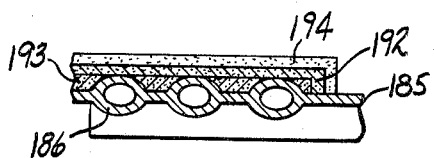
FIGURE 4 is a view along the line IV—IV of FIGURE 3.
Figure 5:
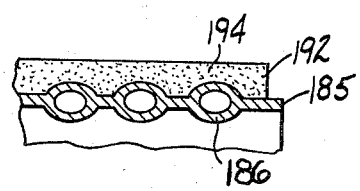
FIGURE 5 is a view along the line V—V of FIGURE 3.

The present invention will be more readily understood by reference to FIGURES 1 through 5 of the appended drawings. In the drawings, burner assembly 184 is interconnected to a complementary storage unit 181. This unit comprises solid porous composite 182 suitably mounted within a storage tank 183 and interconnected by appropriate conduiting to the burner assembly 184. The heater assembly 182 comprises an internally laminated panel 185 whose internal laminations have been distended into a system of fluid passageways 186 bulging out of both faces of the sheet metal unit 185. Tubular passageways 186 of the unit are interconnected by means of a fluid inlet 187 and fluid outlet 189 through conduiting 190 into the burner assembly 184. Burner assembly 184 comprises an integral sheet metal unit 167 suitably laminated internally, as for example by the process of U.S. Patent No. 2,690,002, and suitably distended with the distensions constrained to be bulged out of only one face of the sheet metal unit. The resultant unit 167 will be adapted in this manner to contain a pattern of fluid passageways 168 extending through the length of the unit. Porous composite 169 is suitably mounted adjacent one of the longitudinal ends of sheet metal unit 167 by mounting brackets 172. Adjacent porous composite 169 is formed a header chamber 173 to which is interconnected a gas inlet conduit 174. The circulation of the fluid through the fluid passages 186 of unit 185 and the fluid passageways 168 of burner unit 184 may be induced by any suitable means such as a pump 191. The heater assembly further comprises a porous component 192 metallurgically bonded to one face of the sheet metal heater unit 185 encasing within it a second porous component 193 having a greater porosity to form the desired fluid channels to be disposed between porous component 192 and the solid sheet metal unit 185. In addition, the more porous component 193 is provided with suitable manifold connections, as for example in the areas of the enlarged portions 194 of the less porous component 192, with these manifold channels 301 connected externally of the tank 183 by means of conduiting 195 and 196. The manifold channels 301 may further be provided with a plurality of conduits 302 extending into the more porous component 193. In operation the fluid to be heated is caused to circulate under pressure through the fluid channels defined by the relatively more porous component 193 whereas the heat transfer fluid is circulated through the fluid passageways 186 which are interconnected to the fluid passageways 168 of burner assembly 184. In this manner the heated fluid upon diffusing through the less porous component 192 and during diffusing is heated effectively in contact with the large surface available in the porous bodies, finally emerging on the outside of the porous components to be collected in the hot fluid storage tank 183 or to be removed depending on the purpose of the overall heater structure. In turn, the heat transfer fluids circulating within fluid passageways 186 of the sheet metal heater unit 185 is circulated through the burner assembly 184. Although two separate heater and burner units have been illustrated, it is to be understood that they may be fabricated from a single sheet metal unit wherein the sheet metal heater unit 185 forms a continuation of the sheet metal burner unit 168 with the conduiting 190 duplicated in an appropriate passageway pattern in the single sheet metal unit. Further, although a pump 191 has been utilized to induce circulation of the fluid through the burner and the heater assembly, as will be obvious, such pump may be eliminated by appropriate fabrication of the heater and burner units so as to utilize the thermosyphon principle inducing circulation of the heat transfer fluid.

Although the invention has been described with reference to specific embodiments, materials and details, various modifications and changes, within the scope of this invention, will be apparent to one skilled in the art and are contemplated to be embraced within the invention.

What is claimed is:

A heating unit comprising a sheet metal member containing a system of laminations distended into a corresponding system of fluid passageways, a sheet-like porous body metallurgically bonded to a face of a first portion of said member, channel means disposed between said body and the said first portion of said member, a second portion of said member adjacent and in spaced relationship to said body, a source of combustible gases, first conduit means interconnecting said source to said channels, a second heating unit comprising a second sheet metal member containing therein a system of laminations distended into a system of fluid passageways, a second sheet-like porous body metallurgically bonded to a face of a first portion of said second member, second channel means disposed between said second body and said second member, water storage means encompassing said second heating unit, first inlet means extending through said storage means and connected to one end of said second channels, first outlet means extending through said storage means and connected to an opposite end of said second channels, a second inlet connected at one end of the fluid passageways of said second member, a second outlet connected to the opposite end of said fluid passageways of said second member, a third inlet means connected to one end of the fluid passageways of said first member, a third outlet means connected at the opposite end of said fluid passageways of said first member, second conduit means interconnected between said second outlet and said third inlet, and third conduit means interconnected between said second inlet and said third outlet.

References Cited by the Examiner

UNITED STATES PATENTS 2,726,643 12/55 Edwards _____ 122—33
2,893,702 7/59 Richardson _____ 165—180 X
2,910,094 10/59 Barnes et al. _____ 165—133 X FREDERICK L. MATTESON, Jr., *Primary Examiner.*

KENNETH W. SPRAGUE, ROBERT A. O'LEARY,
*Examiners.*